No. 721,711. PATENTED MAR. 3, 1903.
C. H. LOEW & L. BOLZ.
MACHINE FOR WASHING FILTERING MATERIAL.
APPLICATION FILED NOV. 11, 1901.
NO MODEL. 2 SHEETS—SHEET 1.
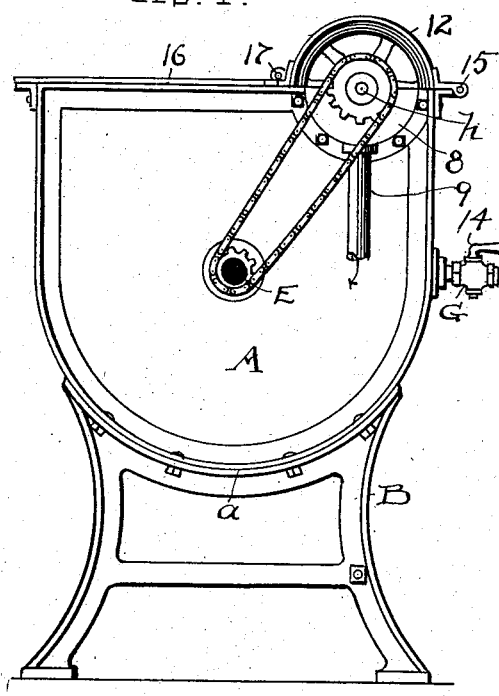
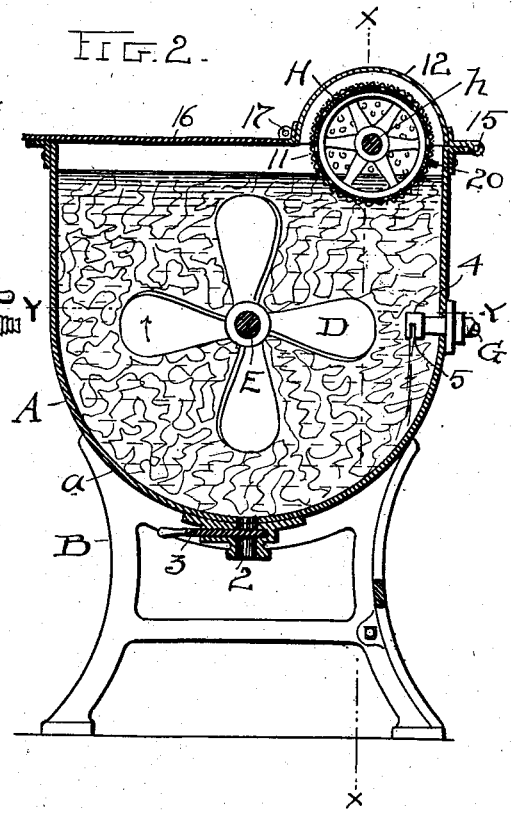
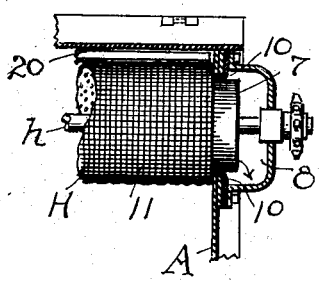
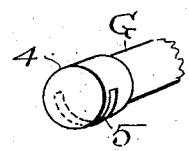
ATTEST
INVENTORS
Charles H. Loew
Leonard Bolz
By W. J. Fisher ATTY No. 721,711. PATENTED MAR. 3, 1903.
C. H. LOEW & L. BOLZ.
MACHINE FOR WASHING FILTERING MATERIAL.
APPLICATION FILED NOV. 11, 1901.
NO MODEL. 2 SHEETS—SHEET 2.
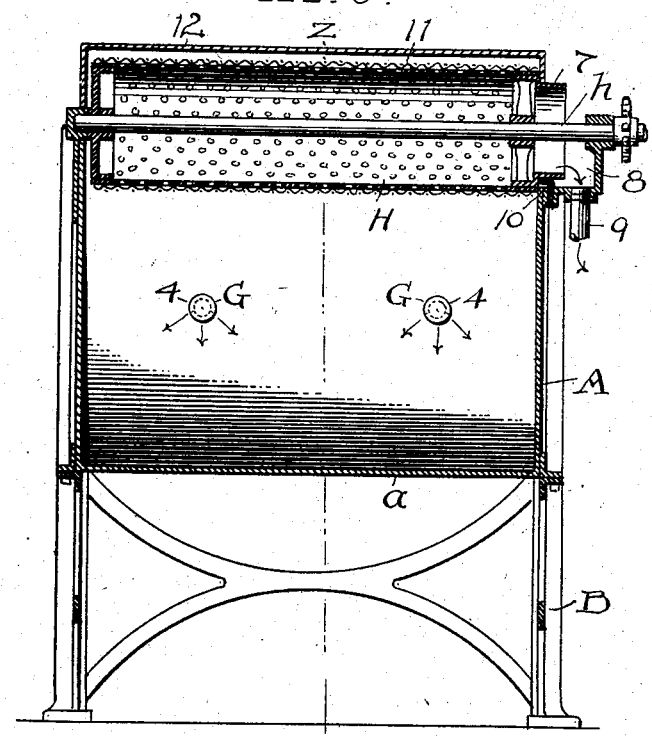
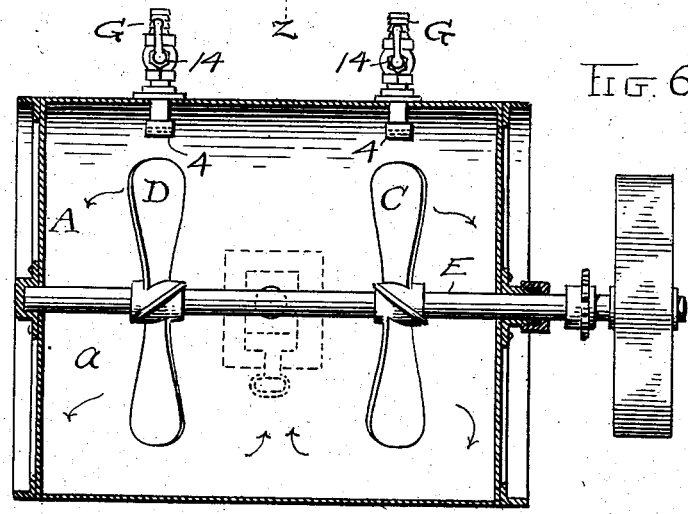
ATTEST
INVENTORS
Charles H. Loew
Leonard Bolz
By W. V. Fisher, ATTY

UNITED STATES PATENT OFFICE.

CHARLES H. LOEW AND LEONARD BOLZ, OF CLEVELAND, OHIO, ASSIGNORS TO THE LOEW SUPPLY AND MANUFACTURING COMPANY, OF CLEVELAND, OHIO, A CORPORATION OF NEW JERSEY.

MACHINE FOR WASHING FILTERING MATERIAL.

SPECIFICATION forming part of Letters Patent No. 721,711, dated March 3, 1903.

Application filed November 11, 1901. Serial No. 81,845. (No model.)

*To all whom it may concern:*

Be it known that we, CHARLES H. LOEW and LEONARD BOLZ, citizens of the United States, residing at Cleveland, in the county of Cuyahoga and State of Ohio, have invented certain new and useful Improvements in Machines for Washing Filtering Material; and we do declare that the following is a full, clear, and exact description of the invention, which will enable others skilled in the art to which it appertains to make and use the same.

This invention relates to a machine for washing filtering material, such as cellulose, wood-pulp, and the like; and the object of the invention is to furnish a machine which will thoroughly cleanse filtering material after it has become fouled in filtering beer, wine, and other liquids, thus preserving the said material to be used over again and again instead of throwing it away after being used the first time.

In the accompanying drawings, Figure 1 is an end elevation of the machine looking in from the right of Fig. 5. Fig. 2 is a cross-section on a line corresponding to line $z\ z$, Fig. 5. Fig. 3 is a plan view of the discharge end of the perforated separating-cylinder at the top of the machine. Fig. 4 is an enlarged view of the inner portion of one of the water-inlet pipes. Fig. 5 is a longitudinal sectional elevation of the machine on line $x$-$x$, Fig. 2. Fig. 6 is a horizontal sectional plan view on line corresponding to $y\ y$, Fig. 2.

A represents a suitable washing-tank supported on legs or base B and having, preferably, a transversely-rounded bottom $a$, as this best promotes the cleansing operations. The idea of this invention is to agitate the pulp or other filtering material in said tank as it is immersed in flowing water and to carry away the fouled water, while the pulp remains in the tank, from which it is drawn off at the bottom through outlet 2 when washed sufficiently. A suitable cut-off plate or valve 3 controls the said outlet, and this or any equivalent medium may be used for opening and closing the said outlet.

Two means of agitation within tank A are used, but chiefly the two sets or pairs of propeller blades or wheels D. These are fixed upon shaft E and set thereon to throw from the center of the tank toward its ends, thus tending to produce vacuum at said center and causing the material to flow thereto from both ends after it has been drawn from the center and thrown toward the ends. The shaft E is connected up in any suitable way with the power. The other source or means of agitation is the inflowing water through the two inlet-pipes G, entering at one side of the tank about midway its elevation in this instance, and having heads 4, constructed with slots 5 in their bottom. The water entering through these slots is caused to spread as it descends, so as to strike the curved side of the tank with a sweeping effect, thus counteracting the tendency of the material to cling to the side and bottom of the tank.

At the top of the tank there is a revolving screened cylinder H, occupying the entire length of the tank and forming the outlet or discharge duct for the water. To this end the said cylinder is supported on a shaft $h$, adapted to be rotated by power and resting in suitable bearings at its ends, and has a somewhat-contracted discharge-neck 7, which projects outward beyond the casing or tank A and empties into the receptacle-mouth 8 for overflow or discharge pipe 9. A gasket 10 serves to make a fairly close connection below neck 7 to prevent backflow of water.

Cylinder H is a perforated body and is further covered with wire-gauze 11 of such closeness of mesh that the filtering material will be held back, while the fouled water is caused to flow out or overflow through said cylinder, and the rotation of the cylinder in the water keeps it clean. Thus a large volume of water may be kept on the flow or run through the tank, and the construction and arrangement of the parts is such that the cleansing effect is especially promoted thereby. Thus it will be observed that cylinder H is located over the inlet-pipes G rather than over the center of the tank, and the mixers are caused to rotate with a sweep toward said cylinder, which itself rotates in the same direction as the mixers, and thus facilitates the movement of the water up on that side of the cylinder beneath its hood 12 rather than throwing it in the opposite direction against the inward sweep of the water through pipes G and into the corner of the tank above. This would simply clog the machine and defeat its operations.

Suitable valves 14 control the inflow of water through pipes G, and hot and cold water can be used, or either, as the material to be cleansed may require.

The top of the tank has a compound cover, the whole being capable of lifting together on hinges 15, or the front part 16 may be turned alone on hinges 17 on the front edge of the rear section or hood 12 for cylinder H.

In the operation as above described, with the flow from the agitators into the space behind cylinder H there is a tendency for the material to pack behind said cylinder, and I have therefore provided the cylinder with a longitudinally-placed blade 20 on its periphery to carry the material downward and throw it into the channels of agitation from blades C and D.

What we claim is—

The tank and the agitator therein, in combination with a perforated cylinder arranged across the top of the tank and dipping into the same its full length, a shaft $h$ supporting said cylinder and bearings therefor in the tank at one end and a lateral extension 8 fixed to the tank providing a bearing at the other end, said extension having an outlet 9 at its bottom, and a discharge-neck 7 on the end of cylinder H projecting across the casing A into extension 8, a screen covering 11 over said cylinder and means to rotate the cylinder, substantially as shown.

Witness our hands to the foregoing specification this 23d day of October, 1901.

CHARLES H. LOEW.
LEONARD BOLZ.

Witnesses:
R. B. MOSER,
H. E. MUDRA.